US008451346B2

(12) United States Patent
Free

(10) Patent No.: US 8,451,346 B2
(45) Date of Patent: May 28, 2013

(54) OPTICALLY PROJECTED MOSAIC RENDERING

(75) Inventor: Robert Mikio Free, San Jose, CA (US)

(73) Assignee: Apple Inc., Cupertino, CA (US)

( * ) Notice: Subject to any disclaimer, the term of this patent is extended or adjusted under 35 U.S.C. 154(b) by 228 days.

(21) Appl. No.: 12/828,006

(22) Filed: Jun. 30, 2010

(65) Prior Publication Data

US 2012/0002086 A1    Jan. 5, 2012

(51) Int. Cl.
*H04N 5/262* (2006.01)
*H04N 5/225* (2006.01)
*H04N 5/228* (2006.01)
*H04N 5/222* (2006.01)
*G06K 9/36* (2006.01)
*G09G 5/00* (2006.01)

(52) U.S. Cl.
USPC ............... 348/239; 348/218.1; 348/222.1; 348/333.12; 348/333.01; 382/284; 382/294; 382/292; 345/629; 345/427; 345/660

(58) Field of Classification Search
USPC ............ 348/36, 218.1, 239, 333.01–333.12, 348/222.1; 382/284, 275, 293, 294; 345/428, 345/660, 427, 629, 640
See application file for complete search history.

(56) References Cited

U.S. PATENT DOCUMENTS

| | | | | |
|---|---|---|---|---|
| 5,850,352 A * | 12/1998 | Moezzi et al. | | 345/419 |
| 6,141,034 A * | 10/2000 | McCutchen | | 348/36 |
| 6,304,284 B1 | 10/2001 | Dunton et al. | | |
| 7,058,237 B2 * | 6/2006 | Liu et al. | | 382/276 |
| 7,292,261 B1 * | 11/2007 | Teo | | 348/36 |
| 7,864,215 B2 * | 1/2011 | Carlsson et al. | | 348/211.11 |
| 2005/0018058 A1 * | 1/2005 | Aliaga et al. | | 348/239 |
| 2005/0031214 A1 * | 2/2005 | Zhang et al. | | 382/232 |
| 2006/0028489 A1 * | 2/2006 | Uyttendaele et al. | | 345/646 |

(Continued)

FOREIGN PATENT DOCUMENTS

| | | |
|---|---|---|
| EP | 1628474 A2 | 2/2006 |
| EP | 2018049 A2 | 1/2009 |
| WO | WO 2009064172 A1 * | 5/2009 |

OTHER PUBLICATIONS

T. Capin, K. Pulli, T. Moller, The State of the Art in Mobile Graphics Research, IEEE Comp. Graph. and Applicat., 74-84 (Jul./Aug. 2008).*

(Continued)

*Primary Examiner* — Nhan T Tran
*Assistant Examiner* — Marly Camargo
(74) *Attorney, Agent, or Firm* — Wong, Cabello, Lutsch, Rutherford & Brucculeri, LLP

(57) ABSTRACT

Methods, systems, and apparatus, including computer programs encoded on a computer storage medium, are described for rendering a mosaic from digital images using information about location and orientation of an image capturing device, and further about optics settings for the image capturing device when the digital images were captured. In one aspect, methods include generating respective virtual image sheets for frames captured from different camera locations and different camera orientations. Generating the virtual image sheets includes projecting texture maps of the captured frames over wire frames corresponding to optics settings of the camera. The methods further include positioning the generated virtual image sheets at locations and orientations within a viewing space that correspond to the different camera locations and the different orientations. The methods also include rendering the positioned virtual image sheets into a mosaic viewed from a reference point of the viewing space.

23 Claims, 5 Drawing Sheets

U.S. PATENT DOCUMENTS

2006/0072176 A1    4/2006    Silverstein et al.
2007/0081081 A1*    4/2007    Cheng .................. 348/218.1
2008/0055568 A1*    3/2008    Kondo et al. ............ 353/94
2010/0136507 A1*    6/2010    Miyata et al. ........... 345/427

OTHER PUBLICATIONS

T. Capin etl., IEEE Comput. Graph. Applic., vol. 28, Issue 4, pp. 74-84 (Jul.-Aug. 2008).*

* cited by examiner

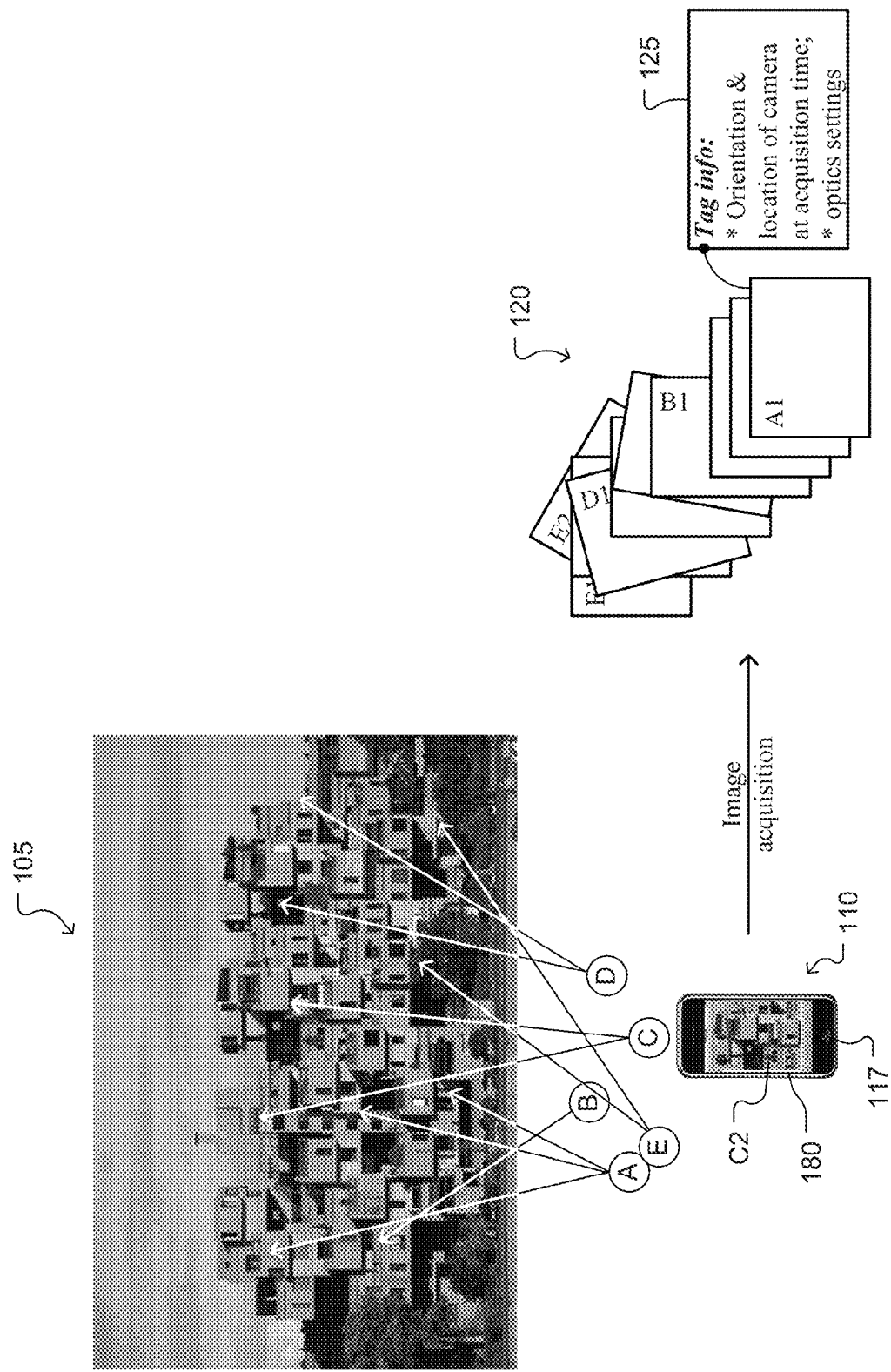

OPTICALLY PROJECTED MOSAIC RENDERING

BACKGROUND

This specification relates to rendering an optically projected mosaic. For example, a mosaic, also referred to as a two dimensional panorama, can be generated by stitching together digital images that have been acquired to have a certain degree of overlap in a horizontal direction, in a vertical direction, or in both. The overlapping portions can be adjusted by performing correlation operations to improve the quality of the mosaic. To increase the success of the adjustments, and thus, the overall quality of the generated mosaic, the images can be acquired by panning the camera in horizontal and vertical direction from a single location.

SUMMARY

This specification describes technologies relating to rendering a mosaic from digital images using information about location and orientation of an image capturing device, and further about optics settings for the image capturing device when the digital images were captured.

In general, one aspect of the subject matter described in this specification can be implemented in methods performed by an image processor that include the actions of generating respective virtual image sheets for frames captured from different camera locations and different camera orientations. Generating the virtual image sheets includes projecting texture maps of the captured frames over wire frames corresponding to optics settings of the camera. The methods further include positioning the generated virtual image sheets at locations and orientations within a viewing space that correspond to the different camera locations and the different orientations. The methods also include rendering the positioned virtual image sheets into a mosaic viewed from a reference point of the viewing space.

These and other implementations can include one or more of the following features. The methods can further include determining the reference point from which to view the mosaic based on a spatial distribution of the different camera locations. In some implementations, determining the reference point includes choosing the reference point's location at equal distances from the different camera locations. In some implementations, determining the reference point includes choosing the reference point's location such that respective distances to the different camera locations are inversely proportional to an associated numbers of frames acquired per camera location. In addition, the reference point from which to view the mosaic can be received through an input interface.

In some implementations, positioning the generated virtual image sheets in image space can include placing the generated virtual image sheets in the viewing space at a predetermined distance from respective different camera locations along respective rays extended from corresponding ones of the different camera locations to centers of the virtual image sheets. The rays are determined by corresponding ones of the different camera orientations. Positioning the generated virtual image sheets in image space can further include orienting the placed virtual image sheets in the viewing space such that respective normals of the virtual image sheets are antiparallel to the respective rays extended from the corresponding ones of the different camera locations to the centers of the virtual image sheets. The methods can further include pre-storing wire frames corresponding to predetermined optics settings of the camera. In some implementations, the methods can include using a single wire frame for generating the virtual image sheets when the frames were captured using identical camera optics settings. In some implementations, the methods can include using two or more wire frames for generating the virtual image sheets when the frames were captured using corresponding two or more camera optics settings.

In some implementations, the methods can include adjusting the rendered mosaic by blending overlapping portions of projections in a display plane of the virtual image sheets. In some implementations, the methods can include adjusting the rendered mosaic by correlating overlapping portions of projections in a display plane of the virtual image sheets.

According to another aspect, the described subject matter can also be implemented in an appliance including an image capture device configured to capture digital images. The appliance further includes a graphical processing unit (GPU), and a graphical output device communicatively coupled with the GPU. The GPU is configured to perform operations including generating respective virtual image sheets for frames captured from different locations and different orientations of the image capture device. Generating the virtual image sheets includes projecting texture maps of the captured frames over wire frames corresponding to optics settings of the image capture device. The GPU is also configured to perform operations including positioning the generated virtual image sheets at locations and orientations within a viewing space that correspond to the different locations and the different orientations of the image capture device, and rendering to the graphical output device the positioned virtual image sheets into a mosaic viewed from a reference point of the viewing space. In some implementations, the wire frames represent shapes of corresponding image wavefronts.

These and other implementations can include one or more of the following features. The appliance can further include a central processing unit (CPU) communicatively coupled with the GPU. The CPU is configured to perform operations including determining the reference point from which to view the mosaic based on a spatial distribution of the different camera locations. The appliance can also include an input interface communicatively coupled with the CPU. The input device is configured to performed operations including receiving the reference point from which to view the mosaic through. Furthermore, the appliance can include a storage device communicatively coupled with the CPU and the GPU. The storage device is configured to perform operations including pre-storing wire frames corresponding to predetermined optics settings of the image capture device.

In some implementations, the appliance can include a geo-coordinate detector communicatively coupled with the CPU and configured to obtain the different locations of the image capture device, and an orientation detector communicatively coupled with the CPU and configured to obtain the different orientations of the image capture device. For example, the orientation detector includes accelerometers configured to obtain pitch and roll angles of an optical axis of the image capture device, and a compass configured to obtain a yaw angle of the image capture device. The pitch, roll and yaw angles are measured with respect to the Earth's surface. Further, the GPU is further configured to perform operations including adjusting the rendered mosaic by blending and correlating overlapping portions of projections in a display plane of the virtual image sheets.

In some implementations, to perform positioning of the generated virtual image sheets in image space, the GPU is further configured to perform operations including placing the generated virtual image sheets in the viewing space at a predetermined distance from respective different camera locations along respective rays extended from corresponding ones of the different camera locations to centers of the virtual image sheets, the rays being determined by corresponding ones of the different camera orientations, and orienting the placed virtual image sheets in the viewing space such that respective normals of the virtual image sheets are antiparallel to the respective rays extended from the corresponding ones of the different camera locations to the centers of the virtual image sheets.

Particular implementations of the subject matter described in this specification can be configured so as to realize one or more of the following advantages. The use of virtual image sheets including corresponding texture maps projected onto wire frames corresponding to the camera optics settings at a time when the images were captured allows the GPU to render a mosaic that requires minimal or no post processing adjustments, e.g., blending and/or correlations.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 1A, 1B and 1C show an example of an appliance for capturing digital images including information relating to location and orientation of the appliance, and further relating to camera optics settings corresponding to the captured digital images.

Like reference numbers and designations in the various drawings indicate like elements.

DETAILED DESCRIPTION

Figure 1C:
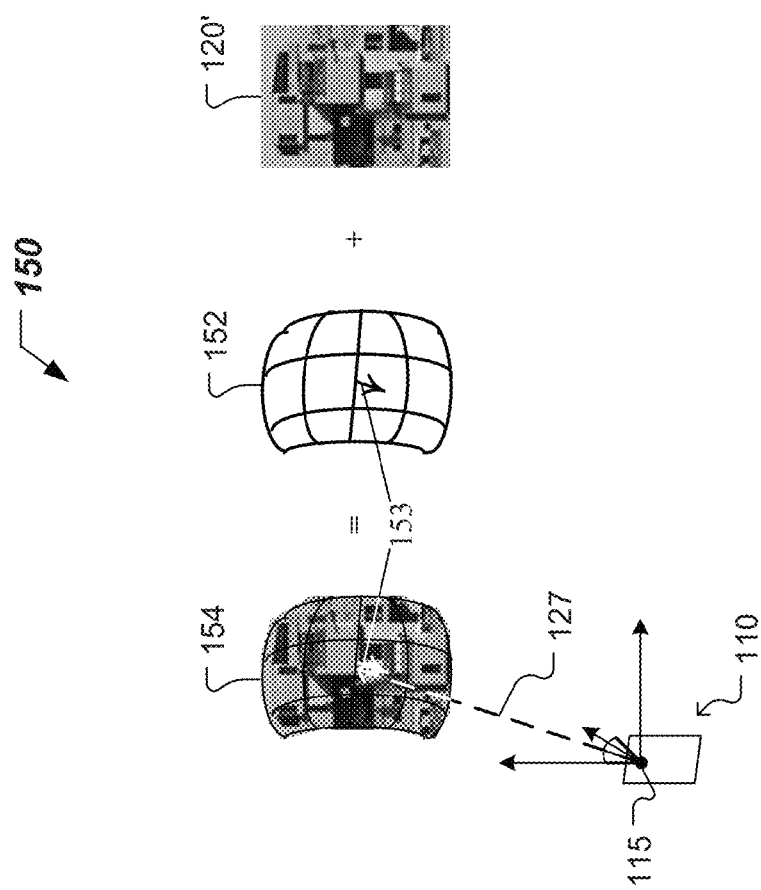

FIGS. 1A and 1B show an example of an appliance 110 that can be used to capture digital images 120 of a scene 105. The appliance 110 includes an image capture device, e.g. a digital camera. A camera input/output interface can include a shutter control 117 and a graphical output device 180 of the appliance 110 for displaying an image in the camera field of view. For example, the appliance 110 can be a smart phone, a tablet computer or any other type of portable electronic device equipped with an image capture device.

A sequence of images 120 of the scene 105 may be acquired from multiple points A, B, C, D and E located in front of the scene 105. For example, a user of the appliance 110 may take pictures of multiple portions of scene 105 from location A. The scene portions are identified diagrammatically by respective rays (depicted as continuous arrows in FIG. 1A) that extend from the appliance 110. The rays represent the orientations of the appliance 110's camera with respect to the scene 105 and are determined by a set of three angles, usually referred to as pitch (angle with respect to a horizontal axis parallel to the scene 105,) roll (angle with respect to a horizontal axis perpendicular to the scene 105), and yaw (angle with respect to a vertical axis parallel to the scene 105). In this case, the user of the appliance 110 may then move to location B and may take a picture of another portion of the scene 105, and then the user may take pictures of yet other portions of the scene 105 from location C, and so on. Image C2 displayed on the graphical output device 180 of the appliance 110 can represent the second image acquired from location C, for instance.

The appliance 110 is configured to generate a mosaic of digital images from the acquired sequence of images 120. As described in detail in connection with FIGS. 2 and 3, the appliance 110 uses information 125 associated with each image in the sequence of images 120 to generate the mosaic of digital images, or simply the mosaic.

The information 125 associated with an image includes an orientation with respect to the scene 105 and a location of the camera at the time when the image was acquired. For example, a portion of the associated information 125 relating to orientation of the camera includes the pitch, roll and yaw. In some implementations, the orientation of the camera can be obtained from orientation sensors included in the appliance 110, e.g., a combination of accelerometers and a compass, a gyroscope, and the like. As another example, a portion of the associated information 125 relating to the location of the camera includes geo-location coordinates. In some implementations, the camera's geo-location coordinates can be latitude and longitude obtained by the appliance 110 from a geo-positioning system (GPS). In some implementations, the camera's geo-location coordinates can be obtained by the appliance 110 from a cell phone provider in terms of distances from known locations of three cell phone towers, for instance.

The information 125 associated with an image further includes settings of camera optics at the time when the image was acquired. For example, the settings of the camera optics can include an f-number "N" given in terms of a ratio between a focal length "f" of a camera lens, and the diameter "D" of an entrance pupil of the camera. The settings of the camera optics determine a shape of an image-wavefront. FIG. 1C illustrates a wire frame 152 representation of an image-wavefront. For example, a setting of the camera optics corresponds to a planar image-wavefront, i.e., the shape of the wire frame 152 is given by $$Px+Ry+Q=0, \quad (1)$$

where (x, y) are in-plane coordinates, and EQ. 1 represents a plane. The camera setting corresponding to a planar shape of the wire frame 152 is given in terms of parameters P, R and Q. As another example, another setting of the camera optics corresponds to a spherical image-wavefront, i.e., the shape of the wire frame 152 is given by $$z^2=Ux^2+Vy^2+Wxy+Px+Ry+Q, \quad (2)$$

where (x, y) are in-plane coordinates, z is an out-of-plane coordinate, and EQ. 2 represents a portion of the sphere. The camera setting corresponding to a spherical shape of the wire frame 152 is given in terms of parameters P, R, Q, U, V and W. As yet another example, yet another setting of the camera optics correspond to a generalized-paraboloid image-wavefront, i.e., the shape of the wire frame 152 is given by $$z=Ux^2+Vy^2+Wxy+Px+Ry+Q, \quad (3)$$

where (x, y) are in-plane coordinates, z is an out-of-plane coordinate, and EQ. 3 represents a portion of the generalized-paraboloid. The camera setting corresponding to a generalized-paraboloid shape of the wire frame 152 is given in terms of parameters P, R, Q, U, V and W.

In some implementations, the information 125 associated with an image includes a set of parameters P, R, Q, U, V and W and a shape equation, e.g., including any one of EQs. 1-3, associated with the wire frame 152 corresponding to the settings of the camera optics at the time when the image was acquired. Moreover, multiple sets of parameters associated with wire frames corresponding to respective camera settings can be stored on the appliance 110.

The appliance 110 can use the information 125 associated with in an image to generate a virtual image sheet 154 corresponding to the image in a viewing space, as illustrated in FIG. 1C. Generating the virtual image sheet 154 includes positioning the center of a wire frame 152 (corresponding to the camera optics settings at the time when the image was acquired) at a point in the viewing space determined by a ray 127, such that a normal 153 to the center of the wire frame 152 is aligned antiparallel to the ray 127. For example, the ray 127 is obtained from information 125 relating to the orientation (pitch, roll and yaw) and the location of the camera 115 at the time when the image was acquired. Generating the virtual image sheet 154 further includes projecting a texture map 120' of the image on the positioned wire frame 152. As described in detail below, the virtual image sheets corresponding to the acquired sequence of images 120 can be generated in a graphical processing unit (GPU) of the appliance 110. Further, the GPU can render the generated virtual image sheets into a mosaic viewed from a reference point in the viewing space.

Figure 2:
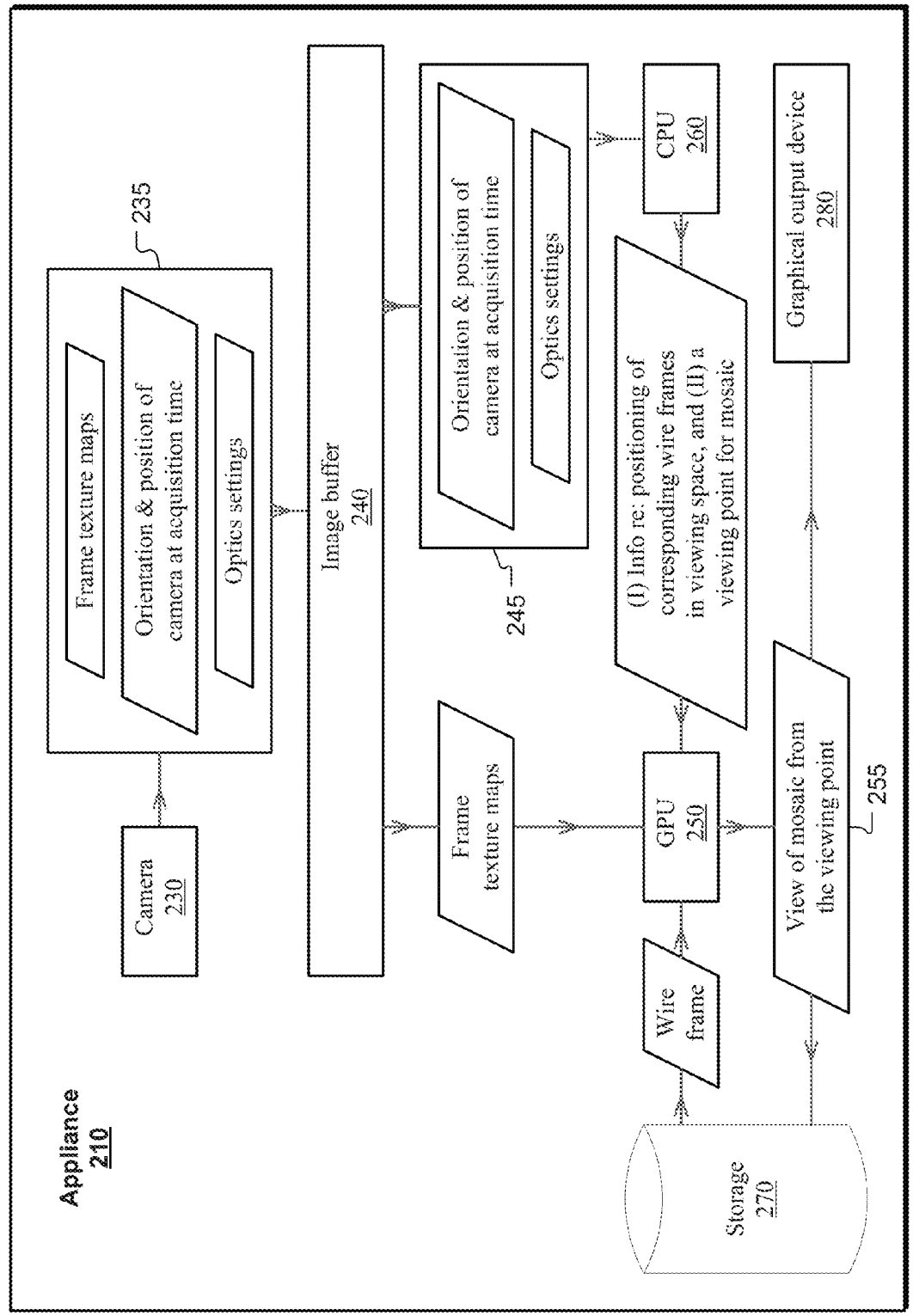
FIG. 2 shows a schematic representation of an appliance configured to render a mosaic from a set of frames captured by the appliance.

FIG. 2 shows an example of an appliance 210 configured to render a mosaic from frames captured by an image capture 230 device of the appliance 210. In some implementations, the appliance 210 can be implemented as the portable electronic device 110 described in connection with FIG. 1 and can render a mosaic from the set of acquired digital images 120.

The appliance 210 includes an image capture device 230, e.g., a digital camera, coupled with an image buffer 240. A graphical processing unit (GPU) 250 and a central processing unit (CPU) 260 of the appliance 210 share the image buffer 240 with the camera 230. The appliance 210 further includes a storage device 270 and a graphical output device 280.

The appliance 210 can capture a sequence of frames using camera 230. The output 235 of the camera 230 includes, for each of the captured frames, a texture map, orientation and location information, and optics settings information. Information corresponding to the orientation of the camera 230 when a frame was captured can be obtained from a 3-axis accelerometer or from a gyroscope included in the appliance 210, for example. As other examples, the information relating to pitch and roll can be provided by a 2-axis accelerometer or by a pair of 1-axis accelerometers that are disposed within the appliance 210 to sense changes in orientation along axes that are normal to an optical axis of the camera 230. The information relating to yaw can be obtained from a compass of the appliance 210 configured to sense a direction of the optical axis of the camera 230. Information corresponding to the location of the camera when a frame was captured can be obtained from a geo-coordinate detector included in the appliance 210. For example, the geo-coordinate detector can receive location information from a GPS. As another example, the geo-coordinate detector can obtain location information from a cell phone network. The camera optics settings information includes at least an f-number of the camera 210 when a frame was captured, and a corresponding wire frame (or the set of parameters P, R, Q, U, V and W described above for generating the wire frame based on a shape equation including one of EQs. 1-3) stored on the storage device 270. In some implementations, multiple wire frames corresponding to respective camera optics settings can be pre-stored on the storage device 270 of the appliance 210.

The output 235 of the camera 230 is transferred to the image buffer 240 such that both the GPU 250 and the CPU 260 have direct access to it. The CPU 260 can use a combination 245 of orientation and location information and optics settings information corresponding to each of the captured frames to determine a position of a corresponding wire frame in a viewing space. For example, the determination of the corresponding wire frame's position can be performed according to the techniques described in connection with FIG. 1C.

The GPU 250 accesses (i) the texture maps of the captured frames from the image buffer 240 and obtains (ii) the corresponding wire frames from the storage device 270, and (iii) information about positioning the corresponding wire frames in the viewing space from the CPU 260 to generate virtual image sheets corresponding to the accessed frame texture maps. For example, when the sequence of captured images was acquired using identical camera optics settings, one corresponding wire frame is obtained from the storage device 270, which is then used for all frames in the obtained sequence. Moreover, the GPU 260 generates the virtual image sheets by projecting the accessed frame texture maps onto the corresponding wire frames as described in connection with FIG. 1C. Further, the GPU 260 positions the generated virtual image sheets at locations and orientations in the viewing space according to positioning information obtained from the CPU 260. The positioned virtual image sheets can be rendered by the GPU 250 as a mosaic 255 viewed from a reference point of the viewing space. The reference point, also referred to as a viewing point, is obtained by the GPU 250 from the CPU 260. As described below in connection with FIG. 4, the viewing point can be determined by the CPU 260 based on the spatial distribution of the frame acquisition locations.

The mosaic 255 viewed from the obtained viewing point can be provided by the GPU 250 for presentation to the graphical output device 280. In some implementations corresponding to the mobile electronic device 110 show in FIG. 1A, the graphical output device 280 can be a display 180. Additionally, the mosaic 255 viewed from the obtained viewing point can be provided by the GPU 250 for storage to the storage device 270.

Figure 3:
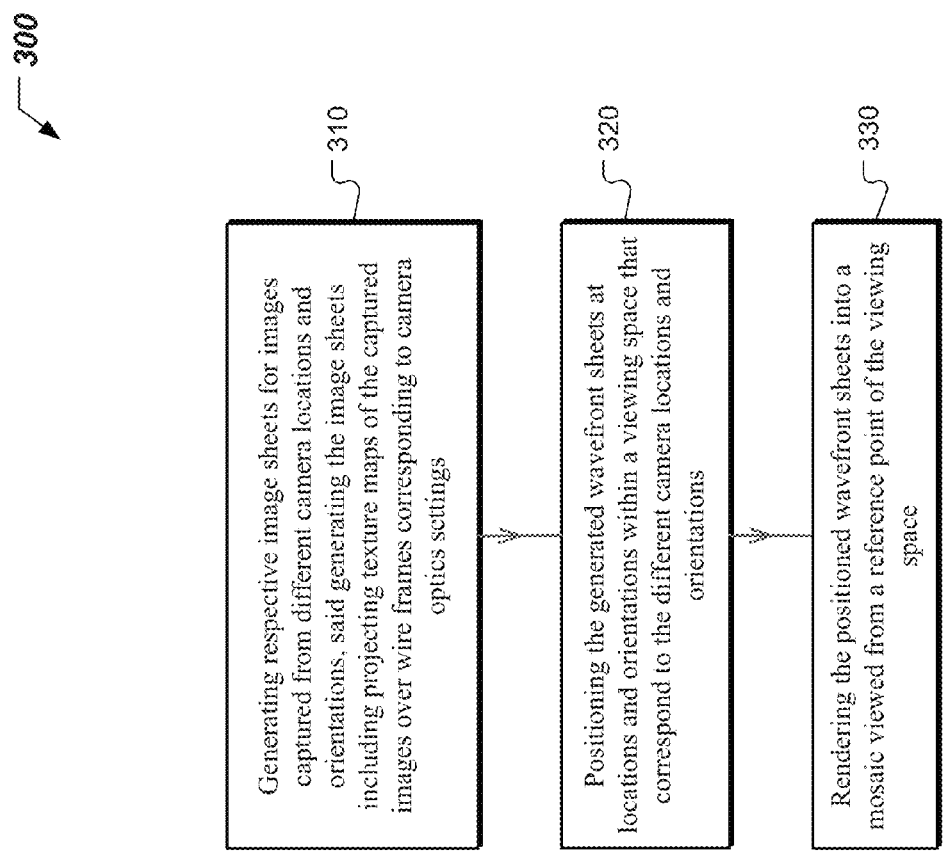
FIG. 3 shows an example of a method for rendering a mosaic from a set of images having known camera locations and orientations, and known camera optics settings when the images were captured.

FIG. 3 shows an example of a method 300 for rendering a mosaic from a set of images having known (i) camera positions and orientations, and (ii) camera optics settings when the images were captured. In some implementations, the method 300 can be implemented by a mobile electronic device 110 as shown in FIG. 1A and/or by an appliance 210 as shown in FIG. 2. Moreover, the method 300 can be performed by a graphical processing unit of devices 110 and/or 210.

Method 300 includes generating 310 respective virtual image sheets for images captured from different camera locations and orientations. Generating 310 the virtual image sheets includes projecting texture maps of the captured images over wire frames corresponding to camera optics settings of the camera. For example, the wire frames are given in terms of parameters P, R, Q, U, V and W corresponding to a shape equation including any one of EQs. 1, 2 or 3.

The method 300 also includes positioning 320 the generated virtual image sheets at locations and orientations within a viewing space that correspond to the different camera locations and orientations. For example, positioning 320 the generated virtual image sheets in viewing space can be performed in accordance with the procedure described above in connection with FIG. 1C.

Further, the method 300 includes rendering 330 the positioned wavefront sheets into a mosaic viewed from a reference point of the viewing space. In some implementations, the reference point from which to view the mosaic can be determined by a central processing unit (CPU) based on a spatial distribution of the different camera locations. In some implementations, the viewing point can be provided to the CPU via a user interface.

Figures 4A, 4B:
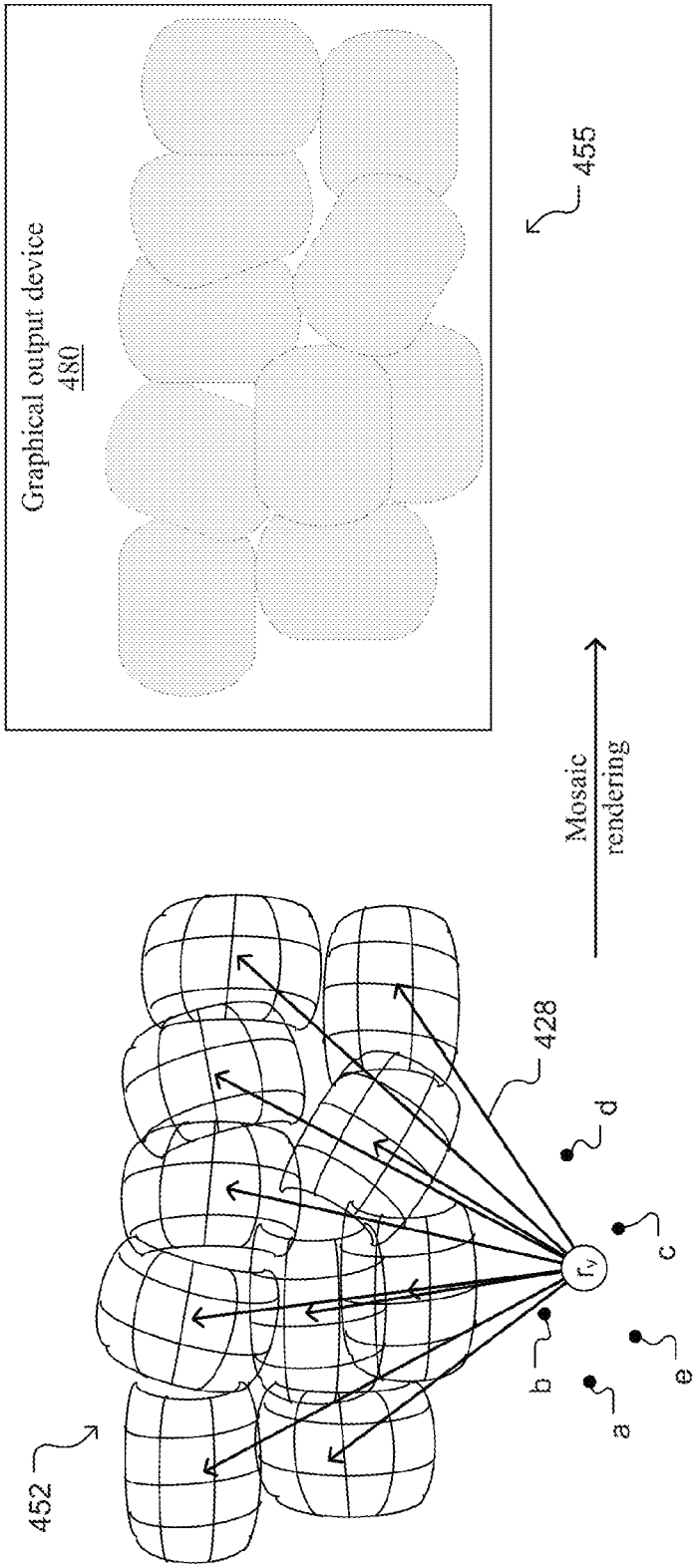
FIGS. 4A and 4B show aspects of the method for rendering a mosaic from the set of images.

FIG. 4A shows aspects of a method 425 for determining a viewing point for a mosaic generated by a graphical processing unit (GPU) in accordance with the method 300. The GPU can generate images sheets 452 corresponding to a set of frames captured from locations "a", "b", "c", "d" and "e". Generation of the virtual image sheets 452 can include projecting texture maps of the captured frames onto corresponding wire frames associated with the respective camera optics settings. Further, the GPU can position the virtual image sheets 452 in viewing space such that respective normals of the virtual image sheets 452 are antiparallel to rays extended from corresponding acquisition points "a", "b", "c", "d" and "e" to respective centers of the virtual image sheets 452, as described above in connection with FIG. 1C.

In some implementations, a location "$r_v$" of the viewing point can be chosen to be at equal distances from the acquisition points "a", "b", "c", "d" and "e". In some implementations, the location "$r_v$" of the viewing point can be chosen to be at distances from the acquisition points "a", "b", "c", "d" and "e" that are weighted by the number of frames captured at each acquisition point. For example, if a largest number of frames were captured at acquisition point "a", the location "$r_v$" of the viewing point would be closer to "a" than to the other acquisition points "b", "c", "d" and "e". Further, if a smallest number of frames were captured at acquisition point "b", the location "$r_v$" of the viewing point would be farther from "b" than from the other acquisition points "a", "c", "d" and "e".

A viewer watching from the viewing point could see the positioned virtual image sheets 452 within respective fields of view corresponding to rays 428 extended from a location "$r_v$" of the viewing point to the centers of the virtual image sheets 452. The GPU can render a mosaic 455 of the positioned virtual image sheets 452 onto a plane, for example a plane defined by a graphical output device 480, as illustrated in FIG. 4B. Rendering the mosaic 455 can include overlaying onto the plane of the graphical output device 480 projections of the virtual image sheets 452 that are normal to the rays 428, respectively. In this fashion, the GPU can render the entire mosaic 455 to the graphical output device 480 without performing correlations of areas where the projections of the virtual image sheets 452 overlap.

In some implementations, necessary adjustments can be performed after rendering the mosaic 455. For example, blending and/or correlation operations may be performed on the rendered mosaic 455, however, such adjustments can be performed efficiently as the information needed for performing the adjustments is already loaded into the GPU. Accordingly, such adjustments may be performed in near real time.

In some implementations, images can be captured from one location, i.e., the acquisition points "a", "b", "c", "d" and "e" collapse onto one point located in front of a scene. For example, the images can be acquired from such one location by panning an image capture device in horizontal and vertical direction. In these cases, a location "$r_v$" of the viewing point is chosen to coincide with the one location at which the images were acquired. In such cases, the method 300 can be implemented by a GPU of the mobile electronic device 110 and/or of the appliance 210 to render a mosaic 455 without having to perform post-rendering correlations. Further in these circumstances if the image capture device is a video camera, the images can be captured at video rates. In some aspects, each of the captured video frames from a sequence of video frames can be rendered by the GPU as part of the mosaic 455 as soon as it is captured. In this manner, the texture map corresponding to the previously captured video frame can be discarded as soon as it has been rendered as part of the mosaic 455. In other aspects, once a video frame from the sequence of video frames has been rendered by the GPU, the next video frame to be rendered can be selected to have a predetermined spatial overlap with the previously rendered video frame, and so on. For example, the predetermined spatial overlap between consecutively rendered video frames can be as small as a slice having a width of 1-pixel.

A multitude of computing devices may be used to implement the systems and methods described in this document, as either a client or as a server or plurality of servers. A computing device can be implemented in various forms of digital computers, such as laptops, desktops, workstations, personal digital assistants, servers, blade servers, mainframes, and other appropriate computers. Another computing device can be implemented in various forms of mobile devices, such as personal digital assistants, cellular telephones, smartphones, and other similar computing devices. Additionally, computing devices can include Universal Serial Bus (USB) flash drives. The USB flash drives may store operating systems and other applications. The USB flash drives can include input/output components, such as a wireless transmitter or USB connector that may be inserted into a USB port of another computing device. The components described here, their connections and relationships, and their functions, are meant to be exemplary only, and are not meant to limit implementations of the inventions described and/or claimed in this document.

A computing device can include a processor, memory, a storage device, a high-speed interface connecting to memory and high-speed expansion ports. The computing device can further include a low speed interface connecting to a low speed bus and a storage device. Each of the above components can be interconnected using various busses, and may be mounted on a common motherboard or in other manners as appropriate. The processor can process instructions for execution within the computing device, including instructions stored in the memory or on the storage device to display graphical information for a GUI on an external input/output device, such as a display coupled to high speed interface. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory can store information within the computing device. In one implementation, the memory can be a volatile memory unit or units. In another implementation, the memory can be a non-volatile memory unit or units. The memory may also be another form of computer-readable medium, such as a magnetic or optical disk.

The storage device can provide mass storage for the computing device. In one implementation, the storage device may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly implemented in an information carrier. The computer program product may also contain instructions that, when executed, perform one or more methods, such as those described above. The information carrier is a computer- or machine-readable medium, such as the memory, the storage device, or memory on processor.

The high speed controller can manage bandwidth-intensive operations for the computing device, while the low speed controller can manage lower bandwidth-intensive operations. Such allocation of functions is exemplary only. In one implementation, the high-speed controller can be coupled to memory, to a display (e.g., through a graphics processor or accelerator), and to high-speed expansion ports, which may accept various expansion cards. In the implementation, low-speed controller can be coupled to the storage device and the low-speed expansion port. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device may be implemented in a number of different forms. For example, it may be implemented as a standard server, or multiple times in a group of such servers. It may also be implemented as part of a rack server system. In addition, it may be implemented in a personal computer such as a laptop computer. Alternatively, components from computing device may be combined with other components in a mobile device. Each of such devices may contain one or more computing devices or mobile devices, and an entire system may be made up of multiple computing devices and mobile devices communicating with each other.

A mobile device can include a processor, memory, an input/output device such as a display, a communication interface, and a transceiver, among other components. The mobile device may also be provided with a storage device, such as a microdrive or other device, to provide additional storage. Each of the above components is interconnected using various buses, and several of the components may be mounted on a common motherboard or in other manners as appropriate.

The processor can execute instructions within the mobile device, including instructions stored in the memory. The processor of the mobile device may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the mobile device, such as control of user interfaces, applications run by the mobile device, and wireless communication by the mobile device.

The processor of the mobile device may communicate with a user through control interface and display interface coupled to a display. The display may be, for example, a Thin-Film-Transistor Liquid Crystal display or an Organic Light Emitting Diode display, or other appropriate display technology. The display interface may include appropriate circuitry for driving the display to present graphical and other information to a user. The control interface may receive commands from a user and convert them for submission to the processor of the mobile device. In addition, an external interface may provide in communication with processor of the mobile device, so as to enable near area communication of the mobile device with other devices. The external interface may provide, for example, for wired communication in some implementations, or for wireless communication in other implementations, and multiple interfaces may also be used.

The memory stores information within the computing mobile device. The memory can be implemented as one or more of a computer-readable medium or media, a volatile memory unit or units, or a non-volatile memory unit or units. An expansion memory may also be provided and connected to the mobile device through an expansion interface, which may include, for example, a SIMM (Single In Line Memory Module) card interface. Such expansion memory may provide extra storage space for the mobile device, or may also store applications or other information for the mobile device. Specifically, expansion memory may include instructions to carry out or supplement the processes described above, and may include secure information also. Thus, for example, expansion memory may be provide as a security module for the mobile device, and may be programmed with instructions that permit secure use of device. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly implemented in an information carrier. The computer program product contains instructions that, when executed, perform one or more methods, such as those described above. The information carrier is a computer- or machine-readable medium, such as the memory, expansion memory, or memory on processor that may be received, for example, over transceiver or external interface.

The mobile device may communicate wirelessly through communication interface, which may include digital signal processing circuitry where necessary. Communication interface may provide for communications under various modes or protocols, such as GSM voice calls, SMS, EMS, or MMS messaging, CDMA, TDMA, PDC, WCDMA, CDMA2000, or GPRS, among others. Such communication may occur, for example, through a radio-frequency transceiver. In addition, short-range communication may occur, such as using a Bluetooth, WiFi, or other such transceiver (not shown). In addition, GPS (Global Positioning System) receiver module may provide additional navigation- and location-related wireless data to the mobile device, which may be used as appropriate by applications running on the mobile device.

The mobile device may also communicate audibly using audio codec, which may receive spoken information from a user and convert it to usable digital information. Audio codec may likewise generate audible sound for a user, such as through a speaker, e.g., in a handset of the mobile device. The sound may include sound from voice telephone calls, may include recorded sound (e.g., voice messages, music files, etc.) and may also include sound generated by applications operating on the mobile device.

The mobile computing device may be implemented in a number of different forms. For example, it may be implemented as a cellular telephone. It may also be implemented as part of a smartphone, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by an image processor, the method comprising:
   generating respective virtual image sheets for frames captured from different camera locations and different camera orientations, said generating the virtual image sheets including projecting texture maps of the captured frames over wire frames corresponding to optics settings of the camera;
   positioning the generated virtual image sheets at locations and orientations within a viewing space that correspond to the different camera locations and the different orientations;
   rendering the positioned virtual image sheets into a mosaic viewed from a reference point of the viewing space; and
   determining the reference point of the viewing space from which to view the mosaic based on a spatial distribution of the different camera locations, wherein said determining the reference point comprises choosing the reference point's location at equal distances from the different camera locations.

2. The method of claim 1, further comprising pre-storing wire frames corresponding to predetermined optics settings of the camera.

3. The method of claim 1, further comprising using a single wire frame for said generating the virtual image sheets when the frames were captured using identical camera optics settings.

4. The method of claim 1, further comprising using two or more wire frames for said generating the virtual image sheets when the frames were captured using corresponding two or more camera optics settings.

5. A method performed by an image processor, the method comprising:
   generating respective virtual image sheets for frames captured from different camera locations and different camera orientations, said generating the virtual image sheets including projecting texture maps of the captured frames over wire frames corresponding to optics settings of the camera;
   positioning the generated virtual image sheets at locations and orientations within a viewing space that correspond to the different camera locations and the different orientations;

rendering the positioned virtual image sheets into a mosaic viewed from a reference point of the viewing space; and determining the reference point of the viewing space from which to view the mosaic based on a spatial distribution of the different camera locations, wherein said determining the reference point comprises choosing the reference point's location such that respective distances to the different camera locations are inversely proportional to an associated numbers of frames acquired per camera location.

6. The method of claim 5, further comprising pre-storing wire frames corresponding to predetermined optics settings of the camera.

7. The method of claim 5, further comprising using a single wire frame for said generating the virtual image sheets when the frames were captured using identical camera optics settings.

8. The method of claim 5, further comprising using two or more wire frames for said generating the virtual image sheets when the frames were captured using corresponding two or more camera optics settings.

9. A method performed by an image processor, the method comprising:

generating respective virtual image sheets for frames captured from different camera locations and different camera orientations, said generating the virtual image sheets including projecting texture maps of the captured frames over wire frames corresponding to optics settings of the camera;

positioning the generated virtual image sheets at locations and orientations within a viewing space that correspond to the different camera locations and the different orientations, said positioning the generated virtual image sheets in the viewing space comprising:

placing the generated virtual image sheets in the viewing space at a predetermined distance from respective different camera locations along respective rays extended from corresponding ones of the different camera locations to centers of the virtual image sheets, the rays being determined by corresponding ones of the different camera orientations, and orienting the placed virtual image sheets in the viewing space such that respective normals of the virtual image sheets are antiparallel to the respective rays extended from the corresponding ones of the different camera locations to the centers of the virtual image sheets; and rendering the positioned virtual image sheets into a mosaic viewed from a reference point of the viewing space.

10. The method of claim 9, further comprising:
receiving the reference point from which to view the mosaic through an input interface.

11. The method of claim 9, further comprising pre-storing wire frames corresponding to predetermined optics settings of the camera.

12. The method of claim 9, further comprising using a single wire frame for said generating the virtual image sheets when the frames were captured using identical camera optics settings.

13. The method of claim 9, further comprising using two or more wire frames for said generating the virtual image sheets when the frames were captured using corresponding two or more camera optics settings.

14. The method of claim 9, further comprising adjusting the rendered mosaic by blending overlapping portions of projections in a display plane of the virtual image sheets.

15. The method of claim 9, further comprising adjusting the rendered mosaic by correlating overlapping portions of projections in a display plane of the virtual image sheets.

16. An appliance comprising:

an image capture device configured to capture digital images;

a graphical processing unit (GPU); and a graphical output device communicatively coupled with the GPU, wherein the GPU is configured to perform operations comprising:

generating respective virtual image sheets for frames captured from different locations and different orientations of the image capture device, said generating the virtual image sheets including projecting texture maps of the captured frames over wire frames corresponding to optics settings of the image capture device;

positioning the generated virtual image sheets at locations and orientations within a viewing space that correspond to the different locations and the different orientations of the image capture device, said positioning operation comprising:

placing the generated virtual image sheets in the viewing space at a predetermined distance from respective different image capture device locations along respective rays extended from corresponding ones of the different image capture device locations to centers of the virtual image sheets, the rays being determined by corresponding ones of the different image capture device orientations, and orienting the placed virtual image sheets in the viewing space such that respective normals of the virtual image sheets are antiparallel to the respective rays extended from the corresponding ones of the different image capture device locations to the centers of the virtual image sheets; and rendering to the graphical output device the positioned virtual image sheets into a mosaic viewed from a reference point of the viewing space.

17. The appliance of claim 9, further comprising:
a central processing unit (CPU) communicatively coupled with the GPU and configured to perform operations comprising determining the reference point from which to view the mosaic based on a spatial distribution of the different image capture device locations.

18. The appliance of claim 16, further comprising:
a central processing unit (CPU) communicatively coupled with the GPU; and
an input interface communicatively coupled with the CPU and configured to perform operations comprising receiving the reference point from which to view the mosaic through.

19. The appliance of claim 16, further comprising:
a central processing unit (CPU) communicatively coupled with the GPU; and
a storage device communicatively coupled with the CPU and the GPU, and configured to perform operations comprising pre-storing wire frames corresponding to predetermined optics settings of the image capture device.

20. The appliance of claim 16, further comprising:
a central processing unit (CPU) communicatively coupled with the GPU;
a geo-coordinates detector communicatively coupled with the CPU and configured to obtain the different locations of the image capture device; and an orientation detector communicatively coupled with the CPU and configured to obtain the different orientations of the image capture device.

21. The appliance of claim 20, wherein the orientation detector comprises:
accelerometers configured to obtain pitch and roll angles of an optical axis of the image capture device; and
a compass configured to obtain a yaw angle of the image capture device, wherein the pitch, roll and yaw angles are measured with respect to the Earth's surface.

22. The appliance of claim 16, wherein the wire frames represent shapes of corresponding image wavefronts.

23. The appliance of claim 16, wherein the GPU is further configured to perform operations comprising adjusting the rendered mosaic by blending and correlating overlapping portions of projections in a display plane of the virtual image sheets.

* * * * *